United States Patent [19]

Prigent et al.

[11] Patent Number: 4,584,333

[45] Date of Patent: Apr. 22, 1986

[54] FIRE-RESISTANT THERMOPLASTIC COMPOSITION

[75] Inventors: Madeleine Prigent, Marcoussis; Jean P. Bonicel, Lyons; Christian Cottevielle, Montreuil, all of France

[73] Assignee: Les Cables de Lyon, Clichy, France

[21] Appl. No.: 691,650

[22] Filed: Jan. 15, 1985

[30] Foreign Application Priority Data

Jan. 17, 1984 [FR] France .................. 84 00640

[51] Int. Cl.$^4$ .............................................. C08K 5/52
[52] U.S. Cl. .................................. 524/127; 524/261; 524/528
[58] Field of Search ................... 524/127, 261, 528

[56] References Cited

U.S. PATENT DOCUMENTS

| | | |
|---|---|---|
| 2,308,975 | 1/1943 | Hoekstra et al. ............... 524/127 |
| 3,619,253 | 11/1971 | Hoffmeyer ....................... 524/127 |
| 3,832,326 | 8/1974 | North et al. ................... 260/42.29 |
| 4,043,975 | 8/1977 | Bost ................................ 524/127 |
| 4,219,607 | 8/1980 | Cammack, II et al. ........ 524/127 |
| 4,278,783 | 7/1981 | Tamiyama et al. ............. 525/20 |
| 4,317,123 | 2/1982 | Namiki et al. ................. 428/463 |

FOREIGN PATENT DOCUMENTS

| | | |
|---|---|---|
| 0004017 | 9/1979 | European Pat. Off. . |
| 0023239 | 2/1981 | European Pat. Off. . |
| 0082407 | 6/1983 | European Pat. Off. . |

OTHER PUBLICATIONS

J. G. Marsden et al.—Organofunctional Silanes—Functions, Applications, and Advantages, Dec. 1979, The British Polymer Journal, pp. 199–205.

*Primary Examiner*—Paul R. Michl
*Assistant Examiner*—N. Sarofim
*Attorney, Agent, or Firm*—Kenyon & Kenyon

[57] ABSTRACT

A fire-resistant thermoplastic composition includes at least one ethylene polymer and/or a copolymer of ethylene and another organic compound, an inorganic loading material capable of releasing oxhydryle ions, an alkoxysilane acting as a coupling agent between the polymer or copolymer and the inorganic loading material, and a plasticizer.

The alkoxysilane is an aminoalkyl-alkoxysilane, and the polymer or copolymer is non reticulated.

9 Claims, No Drawings

FIRE-RESISTANT THERMOPLASTIC COMPOSITION

The present invention relates to a fire-resistant thermoplastic composition, comprising at least one ethylene polymer and/or a copolymer of ethylene and of another organic compound, an inorganic loading material capable of releasing oxhydryl ions, an alkoxysilane acting as a coupling agent between the polymer or copolymer and the inorganic load, and a plasticizer.

Published French patent application FR-A-2 141 918 has already proposed such a composition, in which the alkoxysilane is an alkyl lower-alkoxysilane, an alcenyl-alkoxysilane, or an alcyne-alkoxysilane, especially a vinylsilane. That document also proposed substituting an aminosilane for the alkoxysilane, However, these compositions do not give very good results unless the polymer or copolymer is reticulated and one uses vinylsilane as a coupling agent.

The object of the present invention is to obtain a fire-resistant thermoplastic composition which does not require reticulation of the polymer or copolymer, and which still has good mechanical properties after aging and in the presence of oil.

The composition according to the invention is characterized by its alkoxysilane being an aminoalkyl-alkoxysilane and by a nonreticulated polymer or copolymer.

Preferably it has at least one of the following characteristics:

the aminoalkyl-alkoxysilane is gamma-aminopropyl-triethoxysilane;

the proportion of amino alkyl-alkoxysilane is between 0.5% and 5% by weight of the polymer or copolymer;

the copolymer is a copolymer of ethylene and vinyl acetate;

the copolymer is a copolymer of ethylene and ethyl acrylate or butyl acrylate;

the copolymer of ethylene is grafted with carboxyl groups;

the inorganic loading material is aluminum trihydrate, kaolin, silica, calcium carbonate, or talc;

the proportion of inorganic loading material is between 50% and 20% by weight of the polymer or copolymer; and the plasticizer is triphenylphosphate, in the amount of 1% to 10%, by weight, of the polymer or copolymer.

What follows describes, by way of example, two thermoplastic compositions according to the invention and their mechanical properties after and before aging, either in air or in the presence of oil.

EXAMPLE 1

The composition comprises by weight:

| | |
|---|---|
| Copolymer of ethylene or of vinyl acetate | 100 parts |
| Aluminum Trihydrate Al(OH)$_3$ | 190 parts |
| Gamma-aminopropyl-triethoxysilane | 125 parts |
| Antioxidant (1, 2-dihydro-2, 2, 4-trimethyl-quinolene) | 1 part |
| Triphenylphosphate | 3 parts |

The mechanical properties of this composition, as well as of an identical composition without the gamma-aminopropyl-triethoxysilane, are the following before and after aging:

| | Without Silane | With Silane |
|---|---|---|
| Resistance to breaking Rr (in bars) | 83.2 | 131 |
| Lengthening after breakage Ar (%) | 92 | 180 |
| After 10 days of aging at 100° C. | Rr −55% Ar +82% | +16% −7% |
| After 7 days at 135% | Rr Ar | +8.5% −20% |
| After 4 hours at 70° C. in the presence of oil "ASTM n° 2" | Rr −25% Ar +215% | −25% +14% |
| Index of threshold oxygen | | 39 |

EXAMPLE 2

The composition comprises by weight:

| | |
|---|---|
| Copolymer of ethylene and of vinyl acetate grafted with carboxyl groups | 100 parts |
| Aluminum Trihydrate Al(OH)$_3$ | 170 parts |
| Silica | 30 parts |
| Gamma-aminopropyl-triethoxysilane | 2.5 parts |
| Antioxidant (1, 2-dihydro-2, 2, 4-trimethyl-quinolene) | 1 part |
| Triphenylphosphate | 3 parts |

The mechanical properties, as well as those of an analogous composition, without the gamma-aminopropyl-triethoxysilane, are the following, before and after aging:

| | Without Silane | With Silane |
|---|---|---|
| Resistance to breaking Rr (in bars) | 83 | 130 |
| Lengthening at breakage Ar (%) | 52 | 150 |
| After aging 10 days at 100° C. | Rr brittle Ar unusable | +23% −13% |
| After 4 hours at 70° C. in the presence of oil "ASTM n° 2" | Rr Ar | −22% +35% |

The invention is especially relevant to the manufacture of casing for electrical cables, such as the cables for telephone exchange.

We claim:

1. A fire-resistant thermoplastic composition, comprising at least one ethylene polymer and/or a copolymer of ethylene and another organic compound, an inorganic loading material capable of releasing oxhydryl ions, an alkoxysilane acting as a coupling agent between the polymer or copolymer and the inorganic loading material, and a plasticizer, characterized by the alkoxysilane being an aminoalkyl-alkoxysilane, and by the polymer or copolymer being nonreticulated.

2. A composition according to claim 1, characterized by the aminoalkyl-alkoxysilane being gamma-aminopropyl-triethoxysilane.

3. A composition according to claim 1 or 2, characterized by the proportion of aminoalkyl-alkoxysilane being between 0.5% and 5% by weight of the polymer or copolymer.

4. A composition according to claim 1, characterized by the copolymer being a copolymer of ethylene and vinyl acetate.

5. A composition according to claim 1 characterized by the copolymer being a copolymer of ethylene and ethyl or butyl acrylate.

6. A composition according to claim 4 or 5, characterized by the copolymer being grafted with carboxyl groups.

7. A composition according to one of claims 1, 4, or 5, characterized by the inorganic loading material being selected from the group consisting of aluminum trihydrate, kaolin, silica, calium carbonate, and talc.

8. A composition according to one of claims 1, 4, or 5, characterized by the proportion of the inorganic charge material being between 50% and 200% by weight of the amount of polymer or copolymer.

9. A composition according to one of claims 1, 4, or 5, characterized by the plasticizer being triphenylphosphate, in a proportion of between 1% and 10% by weight of the polymer or copolymer.

* * * * *